(12) United States Patent  (10) Patent No.: US 9,342,643 B2
Oda  (45) Date of Patent: May 17, 2016

(54) NON-TRANSITORY COMPUTER READABLE MEDIUM STORING TIMING ANALYSIS PROGRAM, TIMING ANALYSIS DEVICE, AND TIMING ANALYSIS METHOD

(71) Applicant: Renesas Electronics Corporation, Kawasaki-shi, Kanagawa (JP)

(72) Inventor: Yasuhiro Oda, Kawasaki (JP)

(73) Assignee: RENESAS ELECTRONICS CORPORATION, Kawasaki-Shi, Kanagawa (JP)

( * ) Notice: Subject to any disclaimer, the term of this patent is extended or adjusted under 35 U.S.C. 154(b) by 0 days.

(21) Appl. No.: 13/946,859

(22) Filed: Jul. 19, 2013

(65) Prior Publication Data

US 2014/0068536 A1  Mar. 6, 2014

(30) Foreign Application Priority Data

Aug. 28, 2012 (JP) ................................ 2012-187225

(51) Int. Cl.
*G06F 9/455* (2006.01)
*G06F 17/50* (2006.01)

(52) U.S. Cl.
CPC ........ *G06F 17/5068* (2013.01); *G06F 17/5031* (2013.01)

(58) Field of Classification Search
USPC ....................................................... 716/113
See application file for complete search history.

(56) References Cited

U.S. PATENT DOCUMENTS

| 5,521,837 | A  | * | 5/1996 | Frankle et al. | ................. | 716/113 |
| 6,367,051 | B1 | * | 4/2002 | Pileggi et al. | ................. | 716/114 |
| 7,653,889 | B2 |   | 1/2010 | Nitta et al.   |                   |         |
| 2007/0226669 | A1 |   | 9/2007 | Nitta et al.   |                   |         |
| 2011/0041114 | A1 | * | 2/2011 | Komatsu        | ....................... | 716/134 |

FOREIGN PATENT DOCUMENTS

JP  2007-257375 A  10/2007

* cited by examiner

*Primary Examiner* — Eric Lee
(74) *Attorney, Agent, or Firm* — McGinn IP Law Group, PLLC

(57) ABSTRACT

A timing analysis device includes a storage unit and a processing unit. The processing unit performs storage processing and analysis processing. The storage processing stores circuit information of a circuit to be analyzed, timing constraint information defining timing constraints on the circuit, delay information defining a plurality of delay values associated with a plurality of cells constituting the circuit, and delay upper limit information including at least one delay upper limit for setting an upper limit to the plurality of delay values associated with the plurality of cells into a storage unit. The analysis processing generates a timing analysis result of a circuit to be analyzed, with delay value change processing that changes at least one of the plurality of delay values to the delay upper limit, using the changed delay upper limit in addition to the circuit information, the timing constraint information and the delay information.

20 Claims, 16 Drawing Sheets

| Point (Gate Type) | Inc. | Path |
|---|---|---|
| clock tree delay (propagated) | 1.448 * | 1.448 |
| MOD1/INST1/FF_63_/CLK (FF) | 0.000 * | 1.448 R |
| MOD1/INST1/FF_63_/Q (FF) | 0.137 * | 1.585 R |
| MOD1/INST1/U19/Y (OR2X20) | 0.083 * | 1.668 R |
| MOD1/INST1/CELLs_62_/Y (BUFX10) | 0.832 * | 2.500 R |
| .. | .. | .. |
| slack (VIOLATED) | | -0.699 |

Fig. 3A

| Point (Gate Type) | Inc. | Path |
|---|---|---|
| clock tree delay (propagated) | 1.448 * | 1.448 |
| MOD1/INST1/FF_63_/CLK (FF) | 0.000 * | 1.448 R |
| MOD1/INST1/FF_63_/Q (FF) | 0.137 * | 1.585 R |
| MOD1/INST1/U19/Y (OR2X20) | 0.083 * | 1.668 R |
| MOD1/INST1/CELLs_62_/Y (BUFX120) | 0.212 * | 1.880 R |
| ... | ... | ... |
| slack (VIOLATED) | | -0.079 |

Fig. 3B

ESTIMATION RESULT (CONDITION 100ps@comb, 150ps@FF)

| Point (Gate Type) | Inc. | Path | DIFFERENCE BETWEEN DELAY UPPER LIMIT AND DELAY VALUE |
|---|---|---|---|
| clock tree delay (propagated) | 1.448 * | 1.448 | |
| MOD1/INST1/FF_63_/CLK (FF) | 0.000 * | 1.448 R | |
| MOD1/INST1/FF_63_/Q (FF) | 0.187 * | 1.635 R | 37ps (FF: 150ps) |
| MOD1/INST1/U19/Y (OR2X20) | 0.083 * | 1.718 R | |
| MOD1/INST1/CELLs_62_/Y (BUFX10) | 0.782 * | 2.500 R | 682ps (comb: 100ps) |
| ... | | | | slack (VIOLATED)            −0.699
estimated slack (ESTIMATED slack)    0.020
=SUM OF ACTUAL slack AND DELAY EXCEEDING UPPER LIMIT = −0.699 + 0.037 + 0.682 = 0.020 (MET)

Fig. 7

```
DELAY CORRECTION INFORMATION

NET UPPER LIMIT 20ps    Cell DELAY UPPER LIMIT 80ps
# NET DELAY MODIFICATION
set_annotated_delay 0.020 -net   -from MOD1/INST1/Y
                                 -to MOD1/INST1/CELLs_62_/A
# CELL DELAY MODIFICATION
set_annotated_delay 0.080 -cell  -from MOD1/INST1/CELLs_62_/A
                                 -to MOD1/INST1/CELLs_62_/Y
```

Fig. 11A

ESTIMATION RESULT(CONDITION 80ps@comb, 130ps@FF 20ps@net)

| Point (Gate Type) | Inc. | Path | DELAY EXCEEDING UPPER LIMIT |
|---|---|---|---|
| clock tree delay (propagated) | 1.448 * | 1.448 | |
| MOD1/INST1/FF_63_/CLK (FF) | 0.000 * | 1.448 R | |
| MOD1/INST1/FF_63_/Q (FF) | 0.150 * | 1.598 R | ACTUAL DELAY 0.187 |
| MOD1/INST1/U19/Y (OR2X20) | 0.083 * | 1.681 R | |
| MOD1/INST1/CELLs_62_/Y (BUFX10) | 0.100 * (=80ps+20ps) | 2.500 R | ACTUAL DELAY 0.782 |
| : | | : | |
| slack (MET) | | 0.020 | ACTUAL slack −0.699 |

STA RESULT = ESTIMATED slack ↑

Fig. 11B

```
REPEATER DELAY INFORMATION distance[um]  delay[ns]
                          →NO ADDED VALUE FOR 0 to 500um
                                    →SET DELAY UPPER LIMIT + 150ps AS DELAY CORRECTION VALUE FOR 500um OR MORE
0         0
500       0.150
1000      0.300
1500      0.450
2000      0.450
```

Fig. 14

NON-TRANSITORY COMPUTER READABLE MEDIUM STORING TIMING ANALYSIS PROGRAM, TIMING ANALYSIS DEVICE, AND TIMING ANALYSIS METHOD

CROSS-REFERENCE TO RELATED APPLICATIONS

This application is based upon and claims the benefit of priority from Japanese patent application No. 2012-187225, filed on Aug. 28, 2012, the disclosure of which is incorporated herein in its entirety by reference.

BACKGROUND

The present invention relates to timing design of a semiconductor integrated circuit and, particularly, to timing design applied to 65-nm process technology and 40-nm process technology, for example.

Setup error after performing timing analysis (Static Timing Analysis: STA) has been corrected by resizing a cell such as changing the driving capability of the cell and reducing the threshold voltage (Vt) of the cell. Specifically, data line delay is corrected using an optimizing tool. Then, it is determined from the result of optimization that a path having the setup error remaining after correction of data line delay cannot be modified by automatic optimization using the optimizing tool.

For example, Japanese Unexamined Patent Application Publication No. 2007-257375 discloses a delay analysis device that reduces the burden on a designer and reduces the design period by efficiently and accurately setting the circuit delay of a circuit to be analyzed.

Before 90-nm process technology, it can be determined that clock modification and circuit modification are required when the setup error is not solved by the optimizing tool.

However, as the semiconductor process becomes finer, and in the case where a semiconductor integrated circuit is designed by 65-nm process technology or 40-nm process technology, for example, an issue that data line delay cannot be sufficiently corrected by cell resizing arises. Particularly, such an issue is increasingly common after 40-nm process technology.

Specifically, in the existing timing analysis of a circuit to be analyzed, the setup timing is corrected to a certain degree by layout design, and then the final netlist in which the circuit to be analyzed is expected to satisfy timing constraints is created after that. Layout is then started using the final netlist created in this manner, thereby carrying out timing analysis. In such analysis, although the setup error occurs in about 600 paths in 65-nm process technology, the setup error remains in as many as 15000 paths in 40-nm process technology. Therefore, it has been significantly difficult to check all paths where the setup error has occurred. Further, in most of the remaining errors, a delay value of a cell in a data line is larger than expected. Therefore, the timing of a circuit to be analyzed can be modified by correcting the data line such as upsizing the cell or changing the line path using the optimizing tool.

On the other hand, there are a few paths, among paths where the setup error occurs, that cannot be corrected by the optimizing tool and require manual modification of layout (adjustment of clock delay) and modification of a circuit structure. Further, in timing analysis, the occurrence of errors increases as the analysis proceeds, and it becomes difficult to make sufficient examination of the path to recover the error. Furthermore, when clock modification, circuit modification and the like are made after the analysis proceeds to a certain point, backtracking increases, which makes the modification time-consuming.

SUMMARY

Given the above circumstances, a technique to determine whether timing can be recovered by data line correction or not at the early stage of timing analysis has been desired.

The other problems and novel features of the present invention will become apparent from the description of the specification and the accompanying drawings.

According to one embodiment, a timing analysis technique uses circuit information of a circuit to be analyzed, timing constraint information defining timing constraints on the circuit to be analyzed, delay information defining a plurality of delay values associated with a plurality of cells constituting the circuit to be analyzed, and delay upper limit information. The delay upper limit information includes at least one delay upper limit for setting an upper limit to the plurality of delay values associated with the plurality of cells. The technique then changes at least one of the plurality of delay values associated with the plurality of cells to the delay upper limit, and analyzes timing by estimating a slack value (setup violation value) using the changed delay upper limit.

According to the above-described embodiment, it is possible to provide a technique to determine whether timing can be recovered by data line correction or not at the early stage of timing analysis.

BRIEF DESCRIPTION OF THE DRAWINGS

The above and other aspects, advantages and features will be more apparent from the following description of certain embodiments taken in conjunction with the accompanying drawings, in which:

FIG. 3A is an explanatory diagram of an initial timing analysis result of analyzing the timing of the path of FIG. 2;

FIG. 3B is a diagram showing an example of a timing analysis result of a layout where a cell is resized based on the analysis result of FIG. 3A;

FIG. 7 is a diagram showing an example of a timing analysis result including an estimation result generated by the technique of timing analysis according to the first embodiment;

FIG. 11A is a diagram showing an example of delay correction information where a delay value of delay information is replaced with a delay upper limit by the technique of timing analysis according to the second embodiment;

FIG. 11B is a diagram showing an example of a timing analysis result generated using delay information and delay correction information for the analysis result of FIG. 3A by the technique of timing analysis according to the second embodiment;

FIG. 14 is a diagram showing an example of a repeater delay table.

DETAILED DESCRIPTION

Embodiments of the invention will be described hereinbelow. The following description and the attached drawings are appropriately shortened and simplified to clarify the explanation. In the figures, the identical reference symbols denote identical structural elements and the redundant explanation thereof is omitted.

As described above, in the case of using 65-nm process technology or 40-nm process technology, for example, there has been a case where a path where delay can be modified by the optimizing tool is extracted as the setup error, through there are only a few paths where delay cannot be modified by the optimizing tool, in a related timing analysis technique (the existing timing analysis technique). The following embodiments provide a technique to efficiently extract such a few paths. To facilitate the understanding of the features of each embodiment, the related timing analysis technique is described first and then an aspect of each embodiment is described in detail.

Description of Related Timing Analysis Technique

Figure 1:
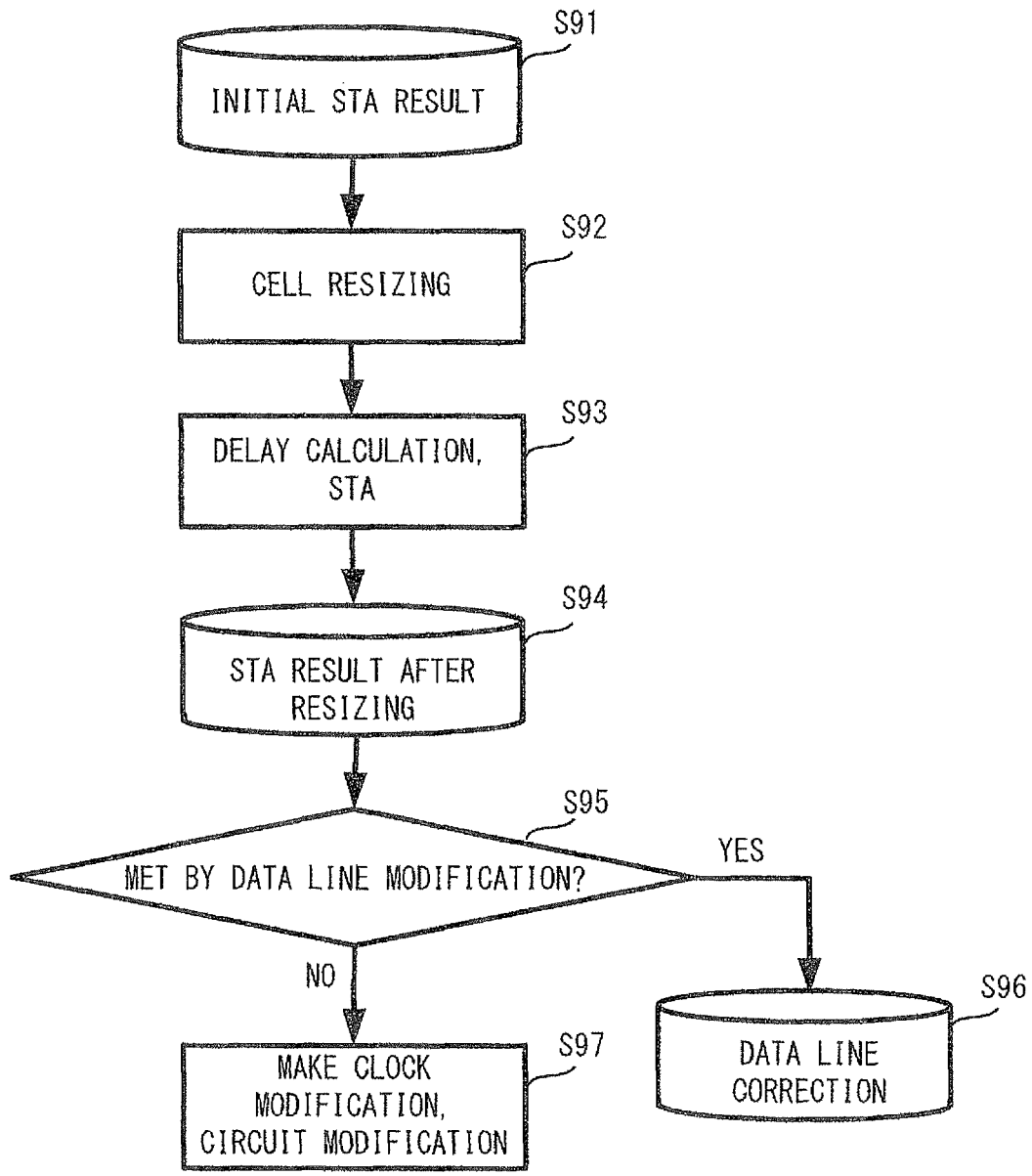
FIG. 1 is a diagram illustrating an example of a procedure of related timing analysis.

FIG. 1 is a diagram illustrating an example of a related timing technique. In the technique of timing analysis shown in FIG. 1, a timing analysis tool and an optimizing tool are used. First, the timing analysis tool generates an initial timing analysis result using a netlist, delay information (SDF: Standard Delay Format) and timing constraint information and stores it into a storage unit (S91). The initial timing analysis result is a timing analysis result (STA result) before modification (resizing).

Next, the optimizing tool performs resizing of a cell for a path reported as setup error in the initial timing analysis result (S92). After that, the timing analysis tool generates a timing analysis result again using a netlist, delay information and timing constraint information after resizing (S93) and stores it into the storage unit (S94). A layout designer checks the timing analysis result after resizing and, when the setup error can be solved by modifying the data line (YES in S95), corrects the data line where the setup error occurs using the optimizing tool or the like (S96). On the other hand, when the setup error cannot be solved by modifying the data line (NO in S95), the layout designer makes clock modification, circuit modification and the like (S97).

The data line modification includes cell resizing performed by the optimizing tool, line layout modification made by a layout designer and the like, and the cell resizing includes change of the driving capability of the cell, change of the threshold voltage (Vt) of the cell and the like.

In 90-nm process technology, automatic modification can be made to the data line where the setup error occurs by the optimizing tool such as cell resizing, and there are only a few paths that are determined to require data line correction by a visual check in Step S95, and most of the setup errors where the data line cannot be modified are errors that require clock modification and circuit modification.

Figure 2:
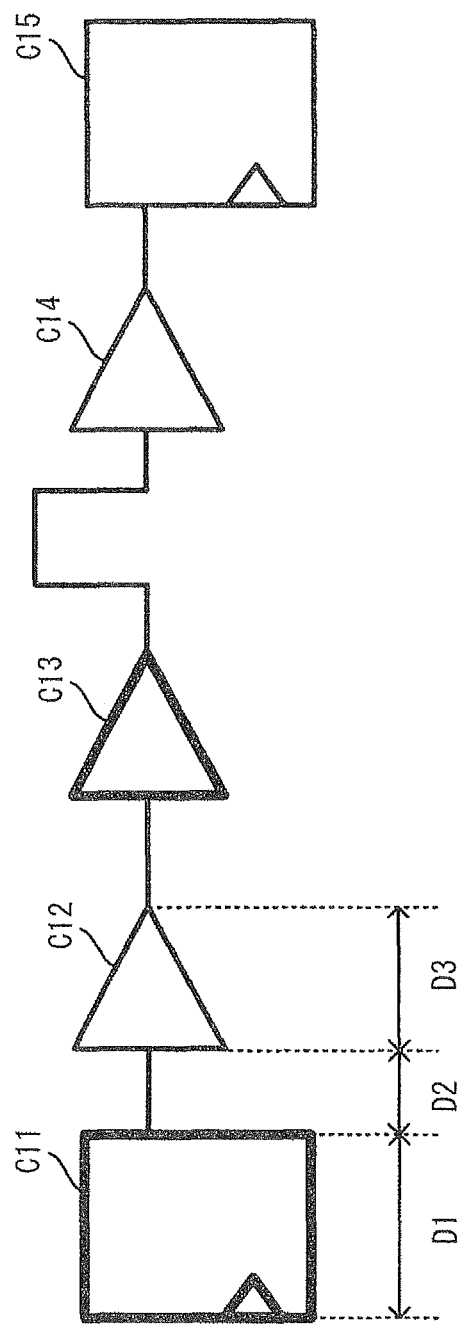
FIG. 2 is a diagram showing an example of a path to be analyzed.

Specific examples of timing analysis results are described with reference to FIGS. 2, 3A and 3B. FIG. 2 is a diagram showing an example of a path to be analyzed in the procedure of FIG. 1. FIG. 3A is an explanatory diagram showing a result of analyzing the timing of the path of FIG. 2. FIG. 3B is an explanatory diagram showing an example of a result of modifying the analysis result of FIG. 3A.

The data line path shown in FIG. 2 includes a cell C11 to a cell C15, the cells C11 and C15 are flip-flops (FFs), and the cells C12 to C14 are buffers. A net (line) between the cell C13 and the cell C14 is where the line length is longer than expected and a line capacitor is formed.

Cell delay, net delay and delay value are described with reference to FIG. 2. Sections D1 to D3 shown in FIG. 2 are an example of sections where cell delay or net delay occurs. The section D1 is a section of cell delay that occurs in the flip-flop of the cell C11, which is from the input pin (input terminal) to the output pin (output terminal) of the cell C11. The section D2 is a section of net delay that occurs in the line between the cell C11 and the cell C12, which is from the output pin of the cell C11 to the input pin of the cell C12. The section D3 is a section of cell delay that occurs in a combinational circuit of the cell C12, which is from the input pin to the output pin of the cell C12.

In the following description, the term "delay value" indicates the amount of delay from the output pin of the previous cell of a given cell to the output pin of the given cell, which is, the amount of delay including cell delay and net delay in principle. For example, the delay value of the cell C12 is the total value of the net delay and the cell delay that occur in the section D2 and the section D3. On the other hand, when distinguishing between cell delay and net delay, they are clearly differentiated as "cell delay value" and "net delay value", respectively. For example, they are represented as the net delay value between the cell C11 and the cell C12 and the cell delay value of the cell C11, respectively. The way of representing the amount of delay is varied as appropriate according to the delay value shown in a timing analysis result.

FIGS. 3A and 3B show a delay value ("Inc.") indicating delay between points (cells) and a path delay value ("Path"), which is the total of delay values up to each point. In FIGS. 3A and 3B, the delay value indicates the total value of cell delay and net delay.

In the timing analysis result of FIG. 3A, the following analysis result is shown.
- 1.448 ns (nanoseconds) until a clock is supplied to the cell C11
- 0.137 ns until a signal is output from the terminal Q of the cell C11 after the clock is supplied to the cell C11
- 0.083 ns until the signal is input to the cell C12 from the terminal Q of the cell C11 and then output from the terminal Y of the cell C12
- 0.832 ns until the signal is input to the cell C13 from the terminal Y of the cell C12 and then output from the terminal Y of the cell 13

Note that the result after the timing when the signal is output from the cell C13 is omitted.

In the timing analysis result, a slack value is −0.699 ns. The slack value is a violation value for the timing specified in the timing constraint information, and when it is zero or a positive value, there is no violation of the timing constraints, and when it is a negative value, there is a violation of the timing constraints.

FIG. 3B shows a timing analysis result after resizing when the driving capability of the cell C13 is modified. It shows that the delay value until the signal is output from the terminal Y of the cell C13 that has been 0.832 ns is corrected to 0.212 ns. However, the timing analysis result after resizing shown in FIG. 3B shows that the slack value is −0.079 ns, which violates the timing constraints, and the setup error remains.

Referring to the timing analysis result after resizing, the delay 212 ps of the cell C13 after data line resizing remains. From visual analysis of a layout designer, it can be determined that it is the line delay that remains after removal and it can be corrected by data line modification. In this manner, it is possible to tell that the timing constraints can be satisfied if the delay of 212 ps is corrected to about 100 ps by visual examination of the timing analysis result; however, when there are a large number or error paths (for example, several ten thousand paths), it is difficult to detect all errors.

Description of Timing Analysis Technique According to One Embodiment

In order to overcome the above-described present situation, a technique that estimates the effect obtained by data line delay correction from a setup violation report shown in a timing analysis result generated by static timing analysis (STA) and efficiently and promptly extracts those requiring feedback to clock adjustment and circuit configuration (RTL modification) is provided in one embodiment.

As the technique of timing analysis according to one embodiment, there are two methods: (1) method that corrects a timing analysis result and (2) method that corrects delay information used for timing analysis.

(1) Method that Corrects Timing Analysis Result

Set a delay upper limit used for a critical path set for each technology. In a timing analysis result, add the excess amount of delay value of cell delay+net delay that exceeds the delay upper limit to the slack value of the timing analysis result as the effect obtained by data line correction, and determine the obtained value as the slack value obtained after data line correction.

(2) Method that Corrects Delay Information

Set (replace) the delay value of data line and cell delay+net delay that exceeds the delay upper limit to (with) the delay upper limit before extracting a timing analysis result, and perform normal STA analysis after that.

The method (1) that corrects a timing analysis result has advantages that the processing does not take time because it corrects the generated timing analysis result and that the current state and the corrected state can be compared. On the other hand, the method (2) that corrects delay information has advantages that a critical path after data line correction can be checked when a path before correcting the delay information is not the critical path after data line correction.

In the above methods, the delay upper limit is set and used for timing analysis.

The delay upper limit is a value for setting the upper limit of the cell or net delay value contained in a circuit to be analyzed (layout), which is set by a layout designer or the like based on the basis of a numerical value from their experiences or the like. As the delay upper limit, at least one upper limit of a cell delay value (cell delay upper limit) and the upper limit of a net delay value (net delay upper limit) are set. The cell delay upper limit is to set the upper limit of the delay allowed for one cell. There is a case where a plurality of cell delay upper limits are set, and different upper limits are set based on the cell type, function and the like in such a case.

Further, as described above, in the case of using the total value of the cell delay and the net delay as the delay value, the total value of the cell delay upper limit and the net delay upper limit is used as the delay upper limit.

In one embodiment, at least one delay upper limit or at least one cell delay upper limit and net delay upper limit is stored into a storage area as delay upper limit information.

Figure 4:
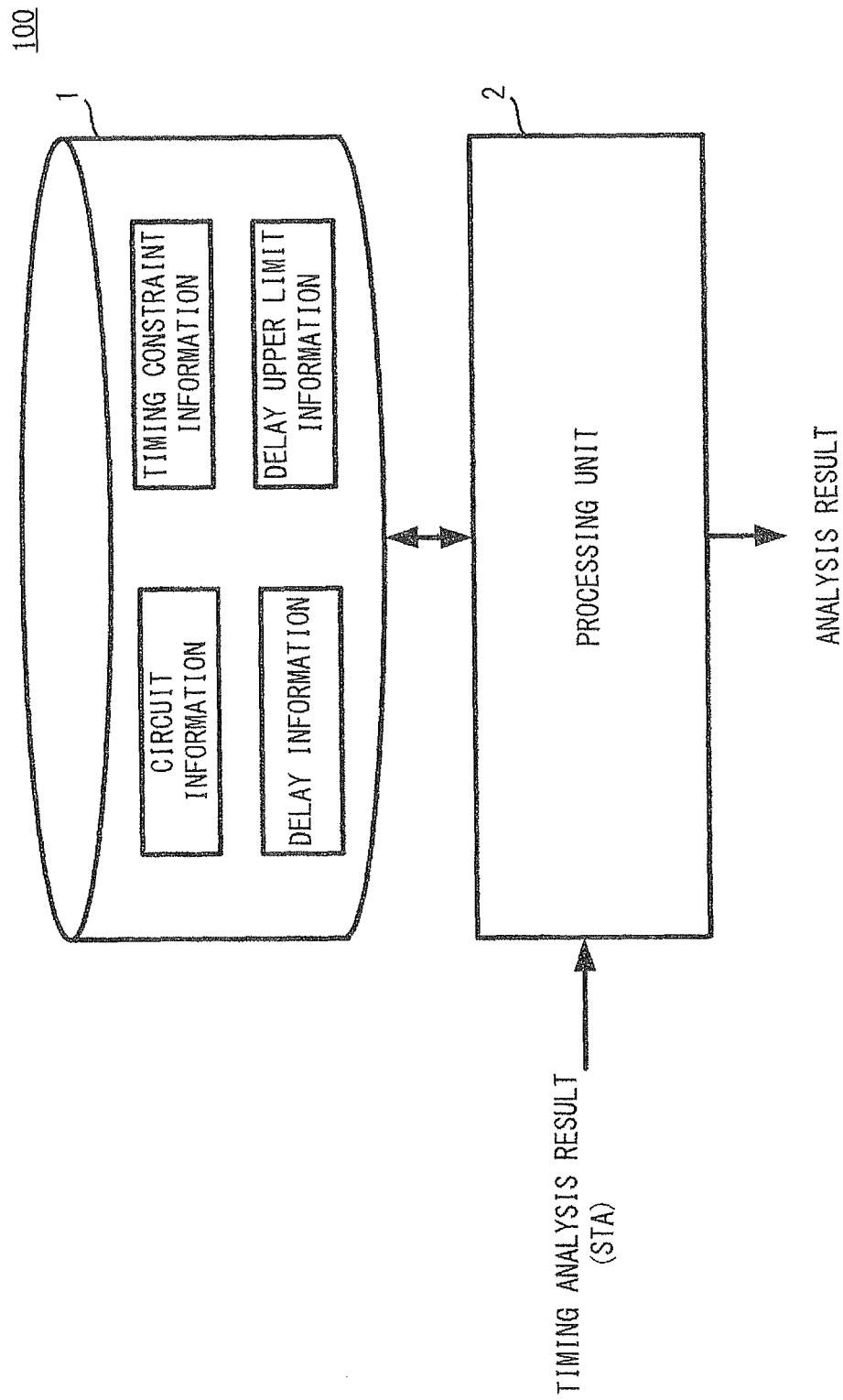
FIG. 4 is a block diagram showing a configuration example of a timing analysis device according to one embodiment.

The technique of timing analysis according to one embodiment can be implemented by using a program that causes a computer to execute each processing. FIG. 4 is a block diagram showing a configuration example of a timing analysis device implemented using the program. A timing analysis device 100 includes a storage unit 1 and a processing unit 2. The timing analysis device 100 is a general-purpose computer such as a personal computer.

The storage unit 1 is a storage area that is accessible from the processing unit 2. The storage unit 1 may be a storage device such as a hard disk, RAM (Random Access Memory) or ROM (Read Only Memory), for example. The storage unit 1 may be a storage medium removable from the timing analysis device 100 such as a CD (Compact Disk), for example.

The processing unit 2 is a CPU (Central Processing Unit) and it reads a program (execution program) for implementing each processing stored in the storage unit 1 and causes a computer to execute a set of instructions in the program. The timing analysis technique according to one embodiment is thereby implemented.

In addition to the storage unit 1 and the processing unit 2, the timing analysis device 100 includes a communication unit that implements a communication function, an input/output unit that controls an interface with an external device and the like, though the description thereof is omitted. For example, the timing analysis device 100 may be implemented using a computer having the hardware configuration shown in FIG. 1 of Japanese Unexamined Patent Application Publication No. 2007-257375.

In the timing analysis device 100, the storage unit 1 and the processing unit 2 are configured to implement the following functions.

The storage unit 1 at least stores circuit information related to design of a circuit to be analyzed, timing constraint information defining timing constraints on a circuit to be analyzed, delay information defining a plurality of delay values to be associated with a plurality of cells included in a circuit to be analyzed, and delay upper limit information. The delay upper limit information includes at least one delay upper limit for setting the upper limit of a delay value to a plurality of delay values associated with a plurality of cells. The circuit information includes a netlist that defines connections of cells (terminals) constituting a circuit to be analyzed and layout information that defines the layout of a circuit to be analyzed. The circuit information may further include a library that defines the characteristics of cells and lines.

The processing unit 2 is configured using a CPU (Central Processing Unit) and executes various kinds of processing according to a set of instructions in the program. According to one embodiment, the processing unit 2 changes at least one of a plurality of delay values associated with a plurality of cells to the delay upper limit, estimates a slack value using the changed delay upper limit and thereby analyzes the timing of a circuit to be analyzed. Then, an analysis result of analyzing whether the circuit to be analyzed satisfies the timing constraints or not is generated based on the estimation result of the slack value.

Figure 5:
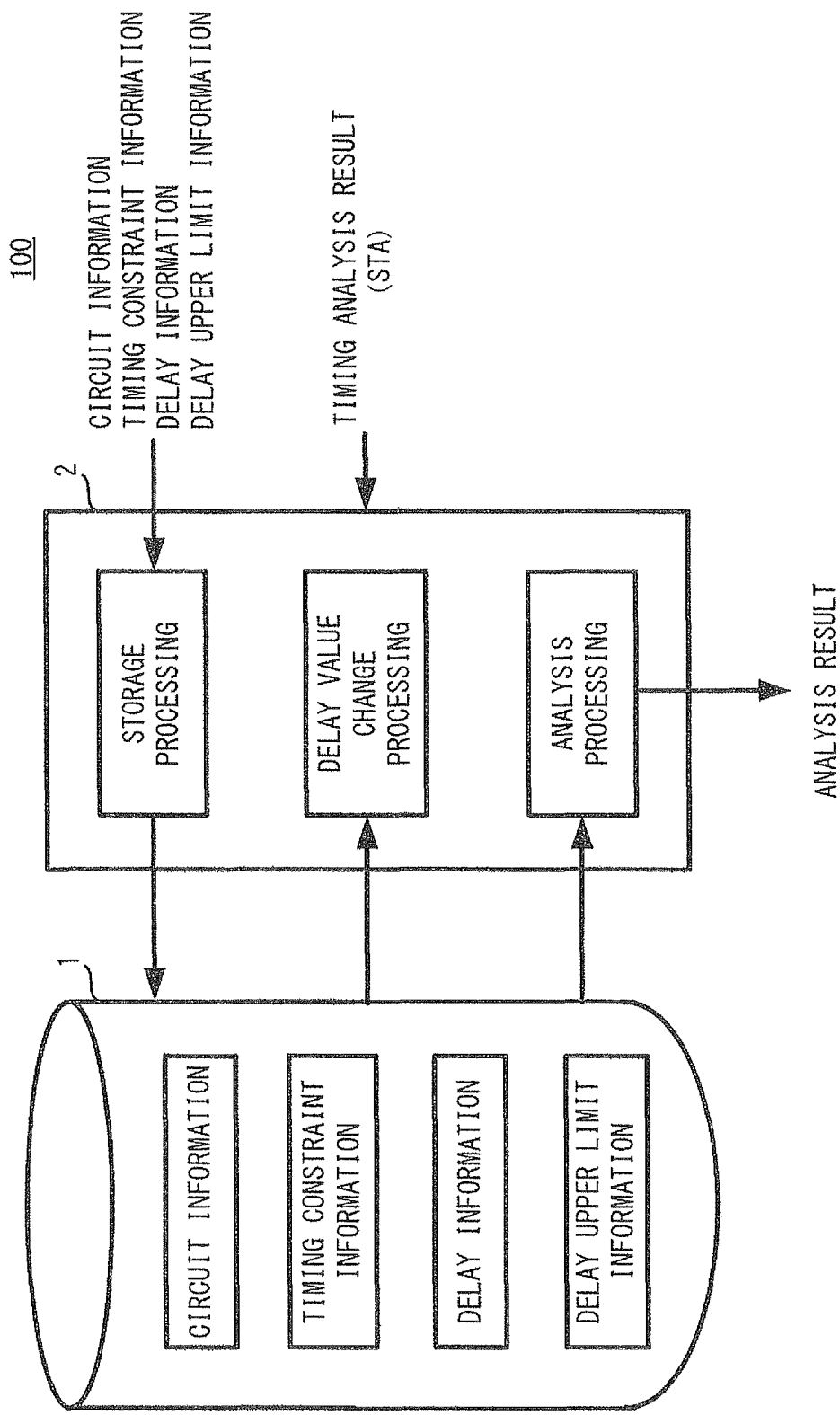
FIG. 5 is a diagram showing an example of each processing executed by a timing analysis device according to one embodiment.

FIG. 5 is a diagram showing an example of processing which the program causes the timing analysis device 100 to execute. Each processing is executed by the timing analysis device 100, so that the timing analysis technique according to one embodiment is implemented. The processing unit 2 reads the program from the storage unit 1 and executes each processing.

As shown in FIG. 5, the program causes the timing analysis device 100 (computer) to execute at least storage processing, delay value change processing and analysis processing.

The storage processing stores the circuit information, the timing constraint information, the delay information and the delay upper limit information into the storage unit.

The delay value change processing changes at least one of a plurality of delay values associated with a plurality of cells to the delay upper limit. Specifically, at least one of delay values to be associated with a plurality of cells is changed to the delay upper limit included in the delay upper limit information. When the delay upper limit information includes a plurality of delay upper limits, the delay value is changed to the delay upper limit associated with a cell whose delay value is changed.

The analysis processing analyzes the timing of a circuit to be analyzed by estimating a slack value using the changed delay upper limit.

By such processing, it is possible to determine whether a circuit to be analyzed satisfies the timing constraints or not when the changed delay upper limit is used, that is, when the data line delay is corrected. As a result, it is possible to easily determine whether the timing can be recovered by way of data line delay correction or not from the early stage of timing analysis.

The processing unit 2 causes a timing analysis tool to generate a timing analysis result. Although the timing analysis tool is not explicitly shown in FIGS. 4 and 5, the execution program of the timing analysis tool may be stored in the storage unit 1, and the processing unit 2 may read and execute the timing analysis tool from the storage unit 1. Further, the timing analysis tool stored in an external computer device may be executed using a communication function, and a timing analysis result may be received through a communication line. In one embodiment, the processing unit 2 may have any configuration as long as it can acquire a timing analysis result generated by the timing analysis tool. Regarding an optimizing tool as well, the processing unit 2 may have any configuration as long as it can acquire a result optimized by the optimizing tool. The processing unit 2 acquires execution results of the timing analysis tool and the optimizing tool and stores them into the storage unit 1. Devices to execute the timing analysis tool and the optimizing tool are a design matter and not described in detail.

Embodiments to implement the technique of timing analysis according to one embodiment are described hereinafter, using processing which the timing analysis program causes the timing analysis device 100 to execute.

First Embodiment

In the first embodiment, the method (1) that corrects a timing analysis result, which is one timing analysis technique according to one embodiment, is described.

Configuration of First Embodiment

Figure 6:
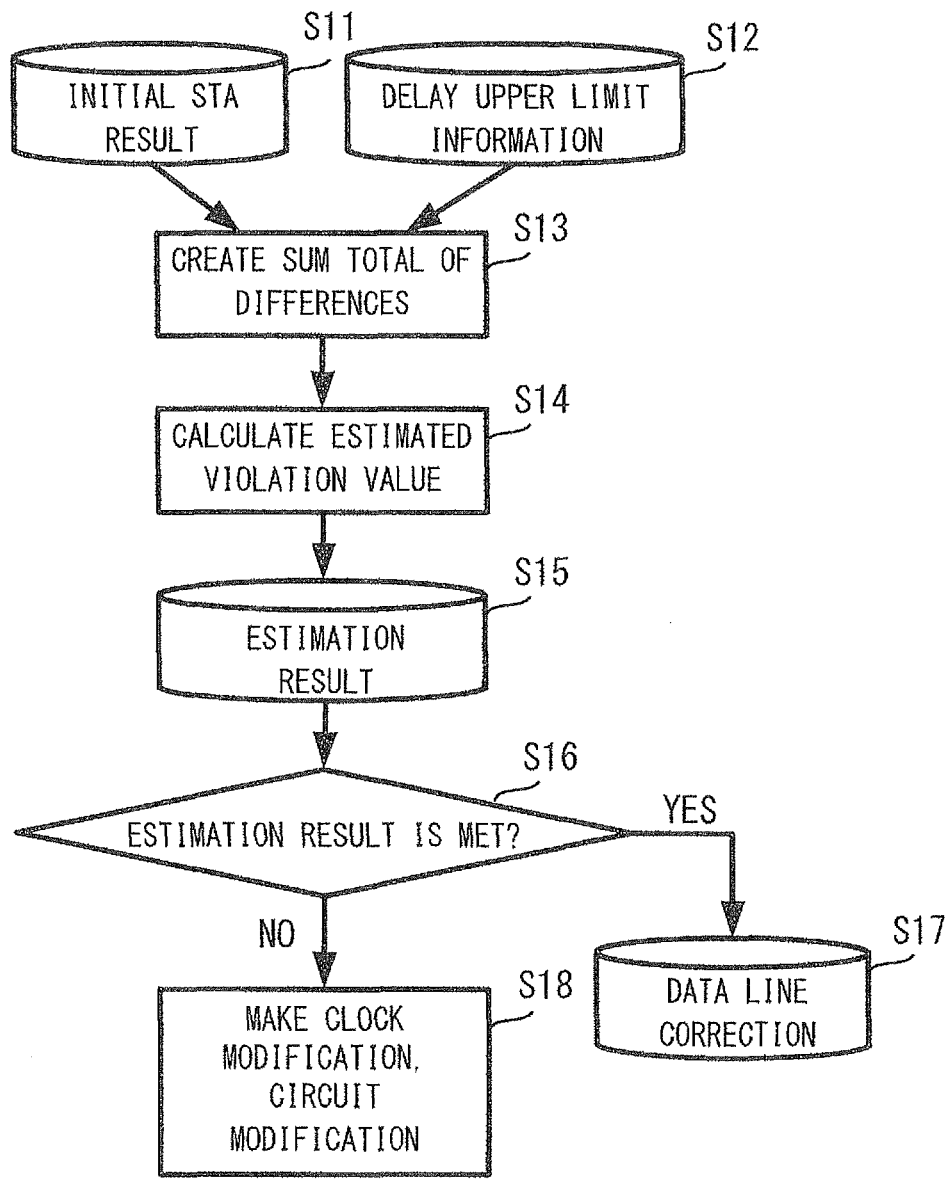
FIG. 6 is a diagram showing an example of a procedure of timing analysis according to the first embodiment and an example of a procedure using a timing analysis result according to the first embodiment.

FIG. 6 is a diagram showing an example of a procedure of timing analysis according to the first embodiment and an example of a procedure using a timing analysis result according to the first embodiment. In the process shown in FIG. 6, Steps S11 to S15 are an example of processing executed by the timing analysis program, and Steps S16 to S18 are a procedure performed by a layout designer using an execution result of the timing analysis program. The timing analysis program according to this embodiment causes the timing analysis device 100 shown in FIG. 4 to execute each processing.

The storage unit 1 stores the circuit information, the timing constraint information, the delay information and the delay upper limit information including the delay upper limit of a cell.

The processing unit 2 receives a timing analysis result (initial timing analysis result) of analyzing a circuit to be analyzed using the delay information, and performs delay value change processing that replaces at least one of a plurality of delay values contained in the initial timing analysis result with the delay upper limit. Then, the processing unit 2 performs analysis processing that calculates a result of estimating a slack value using the changed delay upper limit and inserts the calculated estimation result to the timing analysis result.

Operation, Manufacturing Method etc. of First Embodiment

Processing executed by the timing analysis program according to the first embodiment is described hereinafter with reference to FIGS. 4 to 6.

The processing unit 2 stores a netlist, timing constraint information and delay information related to a circuit to be analyzed into the storage unit 1 according to an instruction of a layout designer, causes the timing analysis tool to execute timing analysis, acquires a generated timing analysis result (initial timing analysis result) and stores it into the storage unit 1 (S11, storage processing). Further, the processing unit 2 acquires delay upper limit information set by the layout designer and stores it into the storage unit 1 (S12, storage processing). The delay upper limit information may be acquired by receiving input of delay upper limit information set by a layout designer through a man-machine interface, for example.

The processing unit 2 extracts the path where the slack value does not satisfy the timing constraints, which is the path where the slack value is a negative value, in the timing analysis result. Because the slack vale of the extracted path indicates a violation value, the processing unit 2 performs processing to detect whether data line correction that solves the violation value is possible or not (S13 to S15). Specifically, the processing unit 2 compares the delay value with the delay upper limit for the cells in the extracted path, calculates a difference between the delay value and the delay upper limit for the cells where the delay value exceeds the delay upper limit, and calculates the sum total of the calculated differences (S13, delay value change processing). Then, the processing unit 2 adds the sum total of the calculated differences to the slack value and calculates the estimation of violation value that can be corrected (estimated violation value) (S14, analysis processing). Specifically, the processing unit 2 calculates the estimation by the calculation formula (the estimated violation value=the slack value of the timing analysis result+the sum total of differences). The processing unit 2 stores the calculated estimated violation value into the storage unit 1 as an estimation result (S15, analysis processing).

Then, a layout designer refers to the estimation result stored in the storage unit 1 and determines whether the estimation result satisfies the timing constraints or not (S16). The processing unit 2 may perform image display as the analysis processing so that the estimation result can be seen. When the timing constraints are satisfied (YES in S16), the layout designer corrects the setup timing of the data line by data line correction. At this time, the layout designer corrects the data line by making the processing unit 2 execute the optimizing tool, modifying the layout wiring and the like, for example (S17). On the other hand, when the timing constraints are not satisfied (NO in S16), the layout designer makes clock modification, circuit modification and the like (S18).

Although the operation example in which the processing unit 2 compares the delay value with the delay upper limit for each cell is described in Step S13 of FIG. 6, it is not limited thereto. For example, when the timing analysis result shows the delay values of cell delay and net delay in distinction from each other, the delay value (the cell delay value and the net delay value) and the delay upper limit (the cell delay upper limit and the net delay upper limit) may be compared for each of the cell delay and the net delay, or the total delay value of the cell delay and the net delay may be compared with the corresponding delay upper limit. Processing may be performed according to the delay value of cell delay or net delay shown in the timing analysis result.

Further, a plurality of different delay upper limits may be set according to the cell type. For example, different delay upper limits may be set between the case where the cell is a flip-flop and the case where the cell is a combinational circuit.

Furthermore, in Step S15, the processing unit 2 may store a modified timing analysis result obtained by inserting the estimation result to the initial timing analysis result and thereby modifying the initial timing analysis result into the storage unit 1 (update the initial timing analysis result). Alternatively, the processing unit 2 may store the estimation result or the estimation result and related information as separate information (for example, estimation result information) into the storage unit 1, rather than inserting them to the initial timing analysis result.

A specific example of the timing analysis result is described hereinafter with reference to FIGS. 2, 3A and 7. The data line to be analyzed is the same as that shown in FIG. 2. FIG. 7 shows an example of a timing analysis result including an estimation result generated by performing the above-described delay value change processing and the analysis processing using the initial timing analysis result in FIG. 3A. The delay upper limit is 150 ps for a flip-flop cell, and 100 ps for a combinational circuit (comb) cell. In the timing analysis result of FIG. 3A, the delay value of the flip-flop cell C11 is 187 ps, which exceeds the delay upper limit 150 ps. Therefore, the processing unit 2 calculates a difference 37 ps of the delay value when the delay value of the cell C11 is changed to 150 ps. Further, the delay value of the combinational circuit cell C13 is 782 ps, which exceeds the delay upper limit 100 ps. Therefore, the processing unit 2 calculates a difference 682 ps of the delay value when the delay value of the cell C13 is changed to 100 ps. The processing unit 2 adds the sum total of differences (0.037 ns+0.682 ns) calculated for the extracted path to the slack value −0.699 ns of the timing analysis result, and thereby calculates the estimated violation value 0.020 ns. Consequently, the estimated violation value is a positive value, so that the timing constraints are satisfied.

The layout designer refers to the result of FIG. 7 and can thereby easily determine that the path satisfies the timing constraints by data line correction.

Mechanism and Effects of First Embodiment

Application of the timing analysis technique according to the first embodiment to a 40-nm 9-pitch cell product resulted in that about 90% of paths were determined to satisfy (meet) the timing constraints by automatic modification. Further, application to a 40-nm 7-pitch cell product resulted in that about 75% of paths were determined to satisfy (meet) the timing constraints by automatic modification. Furthermore, the part where the estimation result (estimated slack value) is less suitable could be checked first, which is significantly effective on product design.

As described earlier, according to the timing analysis technique of this embodiment, the effect obtained by data line delay correction can be estimated from a setup violation report shown in the timing analysis result that is output in static timing analysis (STA). It is thereby possible to efficiently and promptly extract those requiring feedback to clock adjustment and circuit configuration (RTL modification).

Second Embodiment

In the second embodiment, the method (2) that corrects delay information, which is one of the timing analysis techniques according to one embodiment, is described. In the first embodiment, the timing analysis result (initial timing analysis result) is modified using the delay upper limit. On the other hand, in the second embodiment, processing that generates delay correction information for changing delay information using the delay upper limit and causes the timing analysis tool to generate a timing analysis result using the delay correction information is performed. This technique thereby obtains the estimation result generated using the delay upper limit.

A path where the estimation result is calculated is different between the first embodiment and the second embodiment. In timing analysis, it is preferred to comprehensively analyze all paths and generate results in terms of accuracy. On the other hand, it is not practical to generate a large number of results in terms of time and cost. Thus, when there are a plurality of paths to a flip-flop serving as the endpoint (when there are a plurality of flip-flops serving as the starting point), an analysis result is generated for the path with the lowest slack value. Because the timing to replace the delay value of the delay information with the delay upper limit is different between the first embodiment and the second embodiment, the path where the slack value is generated in the timing analysis result is different therebetween. This is described specifically with reference to FIG. 8.

Figure 8:
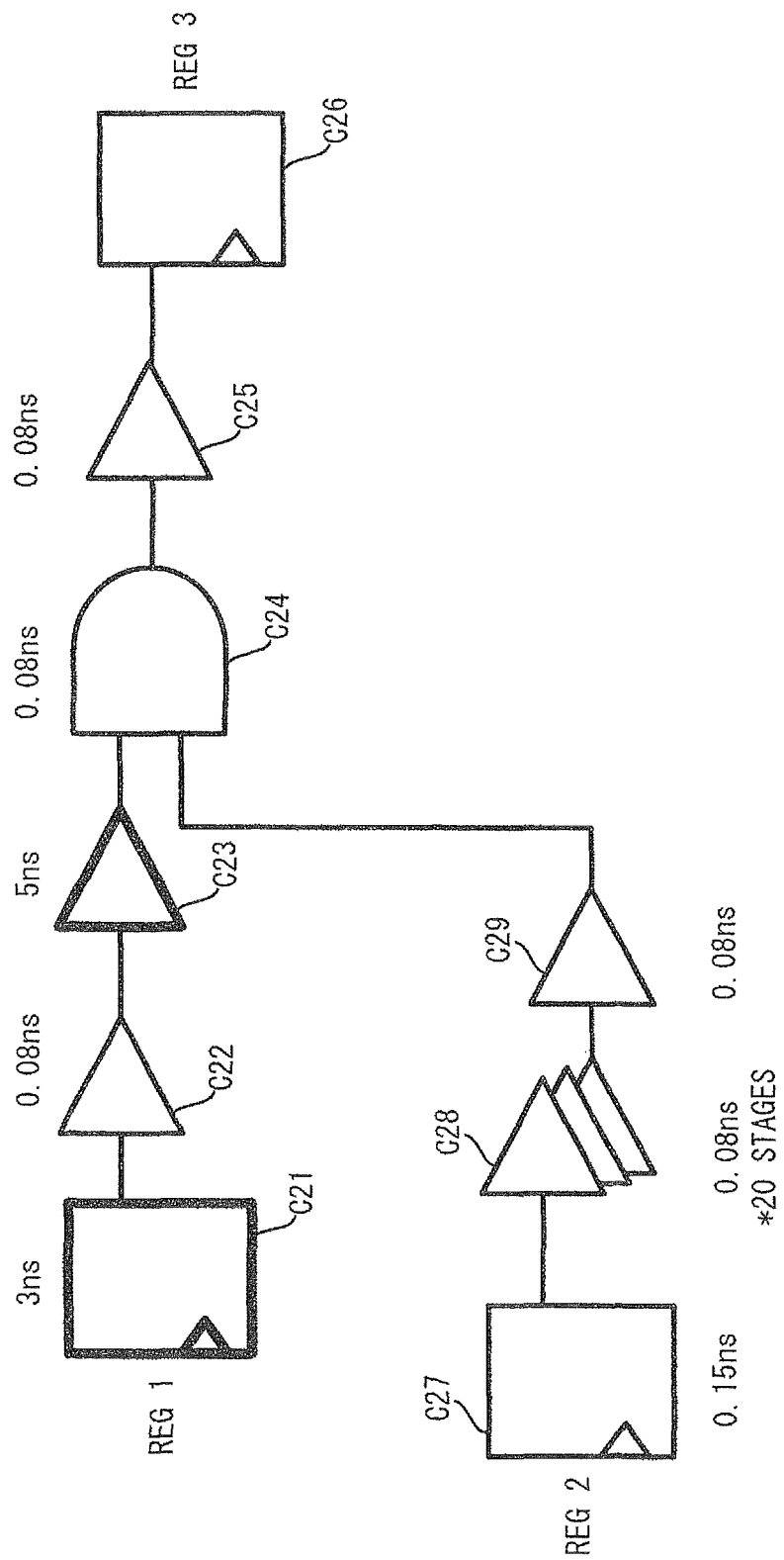
FIG. 8 is a diagram illustrating a path for which an estimation result is calculated in a second embodiment.

FIG. 8 is a diagram illustrating a path for which the estimation result is calculated in the second embodiment. The path from REG1 to REG3 includes cells C21 to C26, and the path from REG2 to REG3 includes cells C27 to C29 and C24 to C26. The numerical value in the figure indicates the actual relay value of each cell. It is assumed that, as the delay upper limit information, the cell delay upper limit of a combinational circuit cell is set to 80 ps, the cell delay upper limit of a flip-flop cell is set to 130 ps, and the net delay upper limit is set to 20 ps. The total delay upper limit of cell delay and net delay is set to 150 ps for a flip-flop cell and 100 ps for a combinational circuit cell.

In the path from REG1 to REG3, the actual delay that is set to the delay information is 8.24 ns, and in the path from REG2 to REG3, the actual delay is 1.99 ns.

In the initial timing analysis result according to the first embodiment, the slack value is generated for the path from REG1 to REG3 where the actual delay is larger, and the estimated delay value after correction is 0.49 ns (0.15+0.08+0.10+0.08+0.08) when the estimation result is calculated using the technique of the first embodiment. This is a result where the delay values of the cells C21 and C23 are changed to the delay upper limit.

On the other hand, in the second embodiment, the timing analysis result is generated by replacing the delay value in the delay information with the delay upper limit, and therefore the estimated delay value of the path from REG1 to REG3 is 0.49 nm, and the estimated delay value of the path from REG2 to REG3 is 1.99 nm, which is the same as the actual delay. Consequently, the timing analysis result is generated for the path from REG2 to REG3, and information about the path from REG1 to REG3 is not contained therein in the second embodiment.

With use of the timing analysis technique according to the second embodiment, the timing analysis result is generated for another path where the violation of the slack value is large (a negative value is large) when the data line delay is corrected by replacement of the delay upper limit. In the second embodiment, the path where the timing constraints are satisfied by data line correction is excluded from the target of generating the analysis result at the state of generating the timing analysis result, thereby allowing easy extraction of the path where the violation of timing constraints is difficult to be solved by data line correction.

This embodiment is described in detail hereinbelow.

Configuration of Second Embodiment

Figure 9:
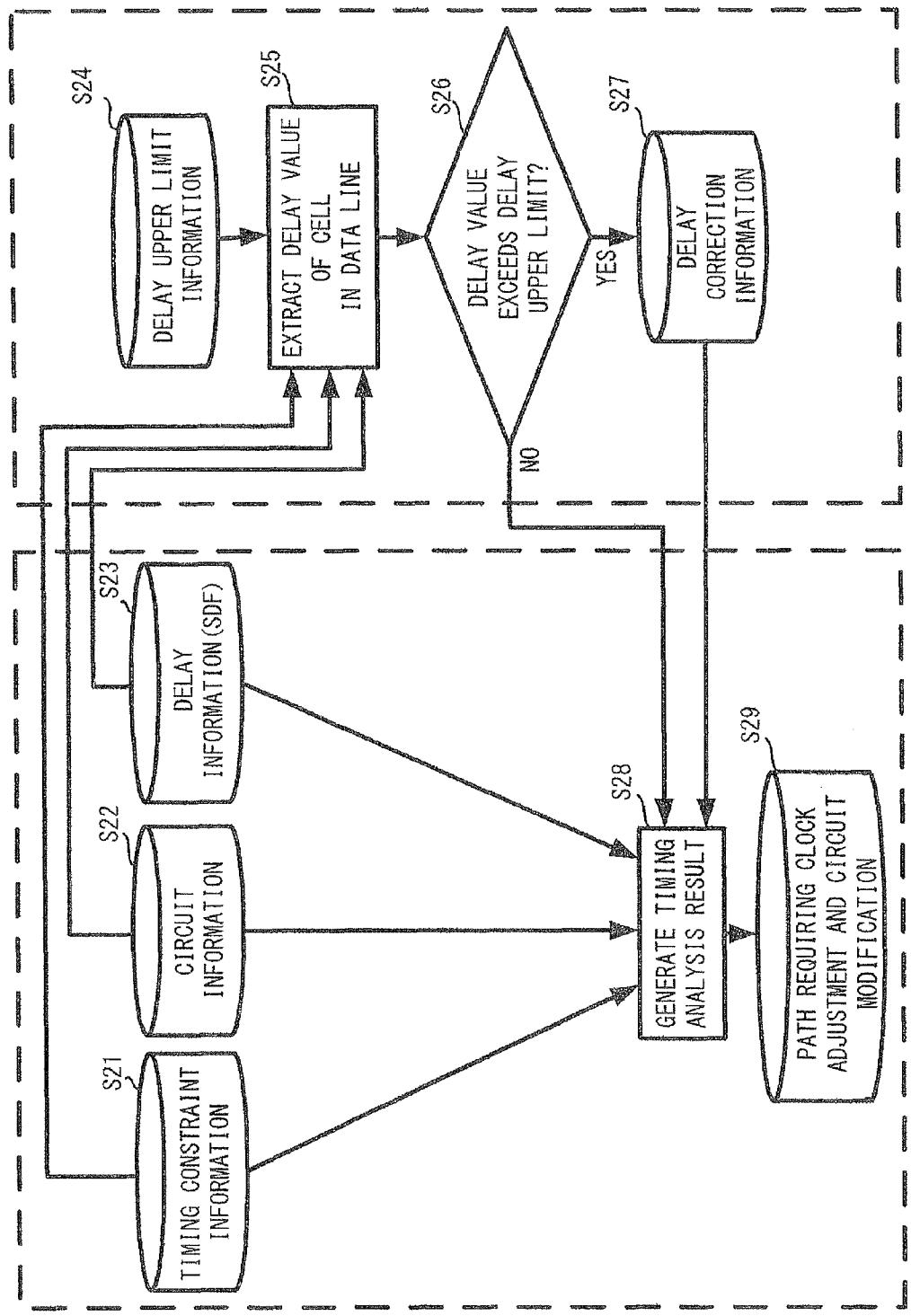
FIG. 9 is a diagram showing an example of a procedure of timing analysis according to the second embodiment.

FIG. 9 is a diagram showing an example of a procedure of timing analysis according to the second embodiment.

In the process shown in FIG. 9, the processing in Steps S21 to S23, S28 and S29 are the same as those of the first embodiment or the related art, and the processing in Steps S24 to S27 is peculiar to this embodiment. In Steps S21 to S23 and S24, each information is generated in advance by a layout designer or the like and stored into the storage unit 1 by storage processing of the processing unit 2, for example. The processing in Step S28 is executed by the timing analysis tool under control of the processing unit 2, and the processing in Step S29 is performed by a layout designer using the timing analysis result. The timing analysis program according to this embodiment causes the timing analysis device 100 shown in FIG. 4 to execute the processing in Steps S25 to S27.

The storage unit 1 stores the circuit information, the timing constraint information, the delay information and the delay upper limit information as in the first embodiment.

In this embodiment, the processing unit 2 performs delay change processing that generates delay correction information and analysis processing that causes the timing analysis tool to conduct timing analysis using the delay correction information and generate the timing analysis result. The delay change processing extracts cells constituting a data line from a netlist and, when a delay value associated with a cell exceeds the delay upper limit, generates delay correction information for modifying the delay value to the delay upper limit.

Operation, Manufacturing Method etc. of Second Embodiment

Figure 10:
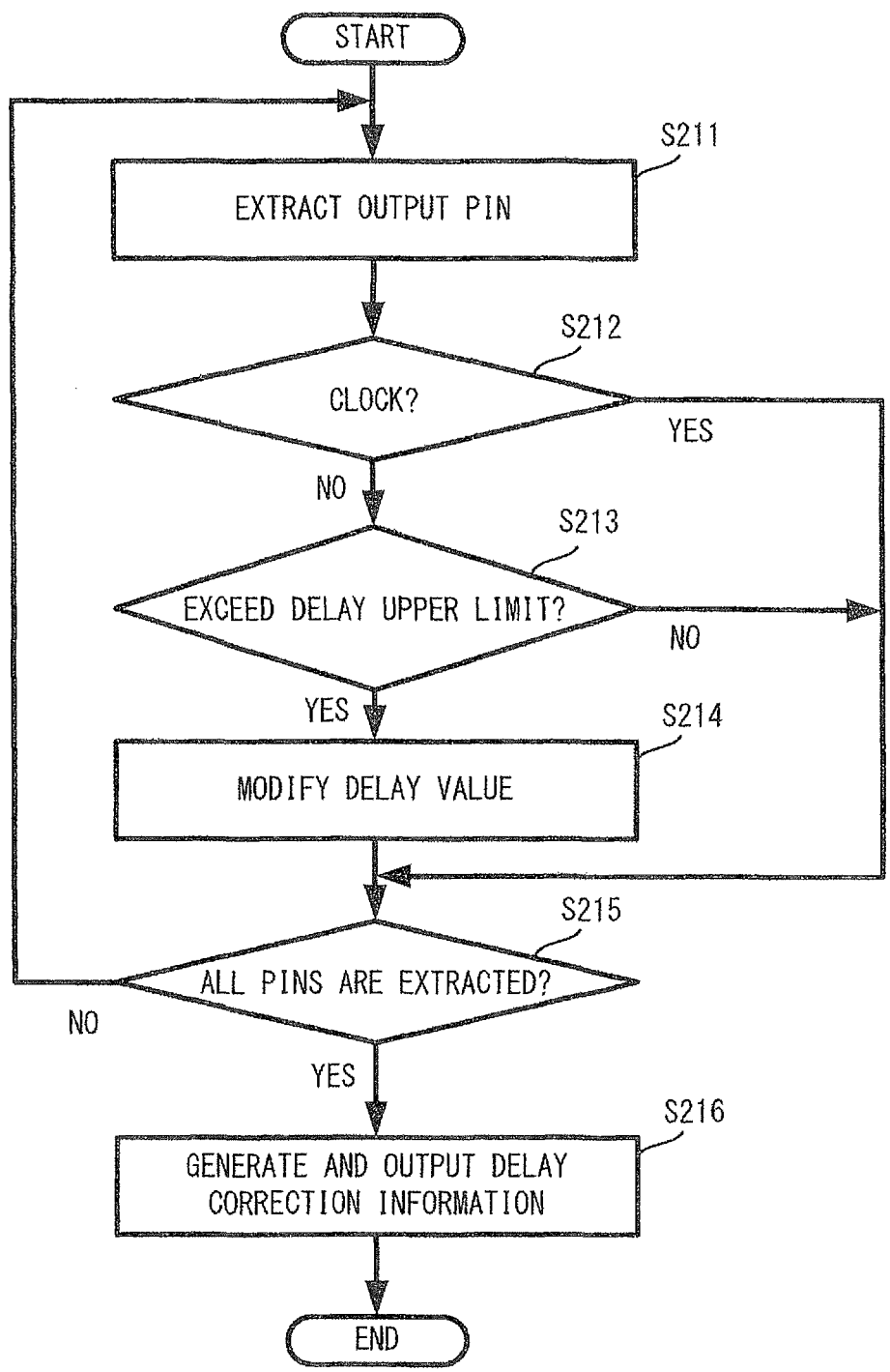
FIG. 10 is a diagram showing an example of operation of generating delay correction information in delay value change processing according to the second embodiment.

Processing executed by the timing analysis program according to the second embodiment is described hereinafter with reference to FIGS. 4, 5, 9 and 10. FIG. 10 is a diagram showing an example of operation of generating delay correction information in the delay value change processing according to the second embodiment;

The processing unit 2 extracts a plurality of cells constituting a data line from a netlist by referring to the circuit information, the timing constraint information and the delay information, acquires the delay value associated with the extracted plurality of cells from the delay information, and acquires the delay upper limit from the delay upper limit information (S25). The processing unit 2 then compares the delay value with the delay upper limit for the extracted plurality of cells and, when it is the cell where the delay value exceeds the delay upper limit (YES in S26), it generates delay correction information for modifying the delay value set to the delay information to the delay upper limit (S27). The generation of the delay correction information (Steps S25 to S27) is described hereinafter in detail with reference to FIG. 10.

The processing unit 2 extracts the output pin of a cell from the circuit information (S211) and determines whether the output pin is a clock pin (S212). When the extracted cell is not a clock (NO in S212), the processing unit 2 acquires the delay value associated with the output pin of the previous cell to the output pin of the extracted cell from the delay information and compares the delay value with the delay upper limit (S213). When the delay value is larger than the delay upper limit (YES in S213), modification information for modifying the acquired delay value to the delay upper limit is stored (S214). On the other hand, when the extracted cell is a clock (YES in S212) and when the delay value is equal to or smaller than the delay upper limit (NO in S213), the process proceeds to Step S215 and the processing unit 2 determines whether all pins have been extracted (S215). When not all pins of the circuit information are extracted (NO in S215), the processing of Steps S211 to S214 is repeated. On the other hand, when all pins of the circuit information are extracted (YES in S215), the delay correction information is generated using the information stored in Step S214 and stored into the storage unit 1 (S216).

When the delay correction information is generated (S27 in FIG. 9; S216 in FIG. 10), the processing unit 2 causes the timing analysis tool to conduct timing analysis using the delay information and the delay correction information (S28). The timing analysis tool reads the delay correction information and modifies the cell or net delay value directed to be modified and thereby carries out timing analysis. On the other hand, when in none of the extracted plurality of cells the delay value exceeds the delay upper limit (NO in S26), the processing unit 2 causes the timing analysis tool to conduct normal timing analysis (S28).

Note that, the case where the delay change processing generates the delay correction information indicating change of the delay value to the delay upper limit and uses the delay information and the delay correction information for the timing analysis tool is described above. However, it is not limited thereto, and the delay correction information where the delay value of the delay information is changed to the delay upper limit may be generated, and timing analysis may be performed using the delay correction information for the timing analysis tool. In this case, the delay correction information includes not only the delay value of a part to be changed but also the delay value of a cell not to be changed.

A specific example of the timing analysis result is described hereinafter with reference to FIGS. 2, 3A, 11A and 11B. The data line to be analyzed is the same as that shown in FIG. 2. FIG. 11A is a diagram showing an example of delay correction information to replace the delay value of the delay information with the delay upper limit by the timing analysis technique according to the second embodiment. FIG. 11B is a diagram showing an example of a timing analysis result generated using the delay information and the delay correction information for the analysis result of FIG. 3A by the timing analysis technique according to the second embodiment. In FIG. 11B, the net delay upper limit is set to 20 ps, the cell delay upper limit of a combinational circuit is set to 80 ps, the cell delay upper limit of a flip-flop is set to 130 ps, respectively, as the conditions for the estimation result. As shown in FIG. 11B, the delay value of the flip-flop cell C11 whose actual delay is 0.187 ns is changed to the delay upper limit 0.150 ns (130 ps+20 ps). Further, the delay value of the combinational circuit cell C13 whose actual delay is 0.782 ns is changed to the delay upper limit 0.100 ns (80 ps+20 ps). As a result, the estimated violation value is 0.020 ns, which is a positive value, so that the timing constraints are satisfied. Because the actual delay when using the delay information is −0.699 ns, the estimated violation value tells that the timing constraints are satisfied by data line correction in the timing analysis result according to the second embodiment. In this manner, a layout designer can easily determine that the timing constraints are satisfied by making data line correction by referring to the result of FIG. 11B.

Mechanism and Effects of Second Embodiment

In this embodiment, the process of replacing the delay value of the delay information with the delay upper limit is performed using the delay correction information. Therefore, as described above with reference to FIG. 8, the path shown in the timing analysis result is different from that of the first embodiment in some cases. Accordingly, there is a case where the path that is not included in the initial timing analysis result becomes an error after data line delay correction in the first embodiment. This occurs in the path from REG2 to REG3 in FIG. 8, for example. On the other hand, such a worry in the first embodiment does not exist in the second embodiment because a result of performing timing analysis after changing the delay information itself is generated. Alternatively, the turnaround time (TAT) of the tool that is substantially the same as when performing timing analysis for extraction of the delay information is needed. It is thus considered that TAT of 1.5 times that of the first embodiment is taken.

Referring to FIG. 8, although the actual delay in the path from REG1 to REG3 is as long as 8.24 ns, it is the data delay of 0.49 ns when estimated in the first embodiment. However, the delay in the path from REG2 to REG3 is 1.99 ns, which is the same as the actual delay, because it does not exceed 0.1 ns (0.15 ns for FF), and therefore the worst path in the estimation differs.

Although the above case can be detected by comprehensively obtaining timing analysis results at the stage of obtaining the initial timing analysis result, it is not practical because a significantly large number of reports are needed. Therefore, the technique that estimates an appropriate critical path at the stage of performing static timing analysis is the one described in the second embodiment.

Third Embodiment

In the first and second embodiments, the delay upper limit is set to a fixed value, such as 100 ps for a combinational circuit and 150 ps for a flip-flop. In this embodiment, the estimation of the delay upper limit is set according to cells.

The processing unit 2 performs delay upper limit setting processing that retrieves layout information of a circuit to be analyzed, extracts the capacitance and the input waveform bluntness of a plurality of cells, calculates the average of the extracted capacitance and the waveform bluntness, applies the calculated average to the cell with the highest driving capability for each function of the plurality of cells, and thereby sets the delay upper limit.

Figure 12:
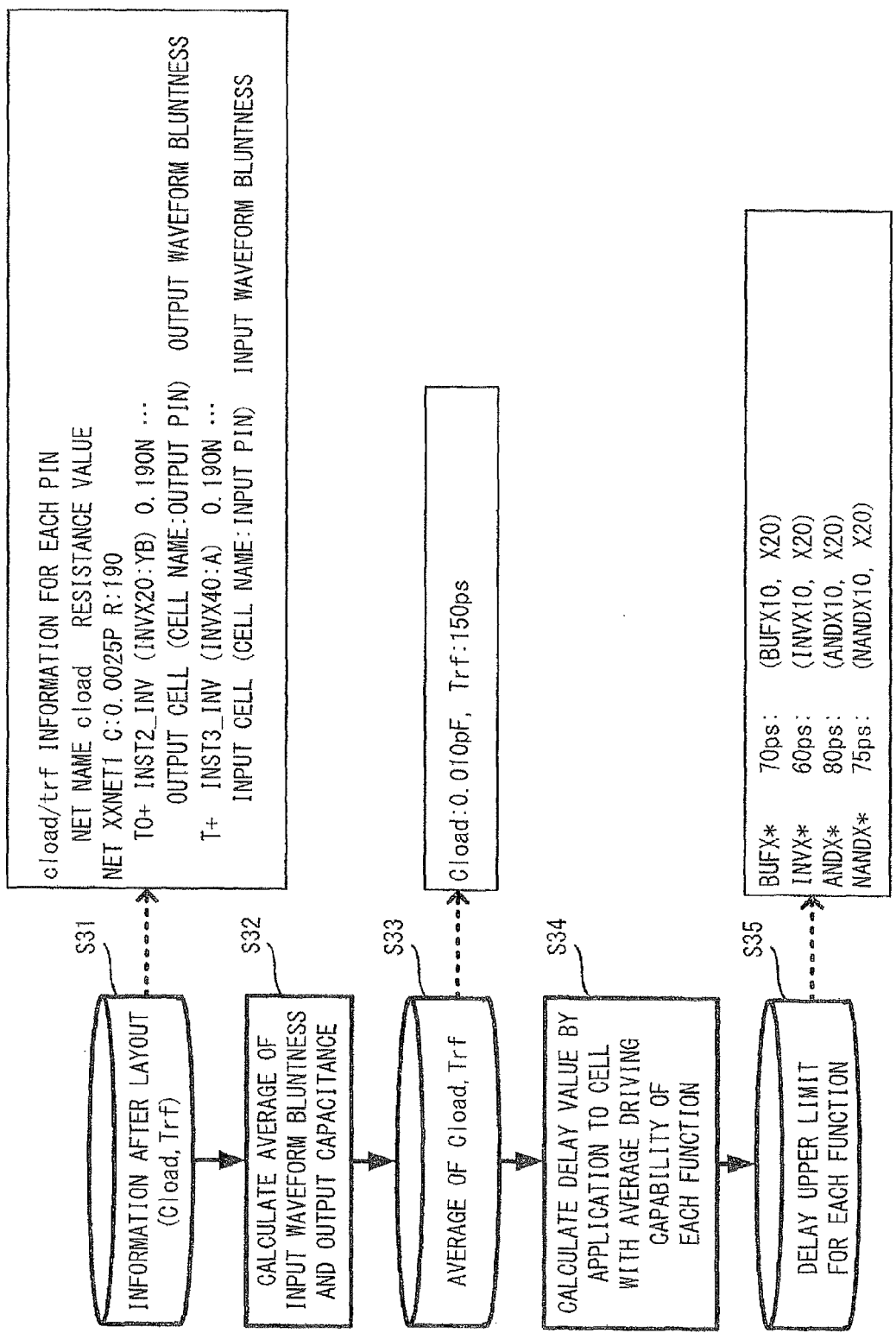
FIG. 12 is a diagram showing an example of a procedure of timing analysis according to a third embodiment.

FIG. 12 is a diagram showing an example of a procedure of timing analysis according to the third embodiment.

The timing analysis program according to this embodiment causes the timing analysis device 100 shown in FIG. 4 to execute the processing from Steps S31 to S35 shown in FIG. 12.

The processing unit 2 reads the layout information of a circuit to be analyzed from the storage unit 1 (S31). The layout information is generated before the timing analysis is carried out and stored into the storage unit 1. The list indicated by the arrow on the right of Step S31 in FIG. 12 shows one example of the layout information.

The processing unit 2 extracts Cload (line capacitance) and TRF (input waveform bluntness) of a plurality of cells from the layout information of a circuit to be analyzed and calculates the average of the line capacitance and the input waveform bluntness of the whole chip (S32). Note that, instead of the average of Cload and TRF of a plurality of cells, the upper limit such as $1\sigma$ or $2\sigma$ may be used. The processing unit 2 stores the average of the line capacitance and the input waveform bluntness into the storage unit 1 (S33). The list indicated by the arrow on the right of Step S33 in FIG. 12 shows one example of the average of the line capacitance and the input waveform bluntness.

Then, the processing unit 2 extracts the cell with the maximum driving capability of each function from the cell library, and extracts the cell delay using the average of the line capacitance and the input waveform bluntness for the extracted cell (S34). The extracted cell delay is stored into the storage unit 1 as the delay upper limit information including the delay upper limit for each function (S35). The cell library is information that is generated in advance by a layout designer or the like. The list indicated by the arrow on the right of Step S35 in FIG. 12 shows one example of the delay upper limit set for each function.

The processing unit 2 generates the delay upper limit information containing the delay upper limits for at least two types of cells, a flip-flop and a combinational circuit other than the flip-flop, among a plurality of cells, for example, and stores the delay upper limit information into the storage unit 1. Alternatively, the processing unit 2 generates delay upper limit information containing the delay upper limit that is defined for each function of a plurality of cells and stores the delay upper limit information into the storage unit 1.

By setting the delay upper limit information generated in the above process for each cell as the delay upper limit in the first or second embodiment, the accuracy of examination can be enhanced.

Further, by extracting the average of line delay from the layout information in the same manner as the above-described cell delay, the accuracy can be enhanced.

Because the delay value is set uniformly in the first and second embodiments, the same delay value is set for a composite cell using AND, OR and the like and a normal buffer, inverter and the like. Because the average delay value differs depending on cell, the accuracy can be improved by extracting the distribution of the line capacitance of the data line and the input waveform bluntness from the information after layout, calculating the average of the line capacitance and the input waveform bluntness, and using them as the delay upper limit in the third embodiment. Note that, the delay value of transistors is determined based on the line capacitance and the input waveform bluntness and therefore the technique of deciding the delay upper limit using those elements is proposed in this embodiment; however, the other elements may be used instead.

Fourth Embodiment

The technique that improves the accuracy of timing analysis based on the layout information of a circuit to be analyzed is described in the fourth embodiment. In layout design, when the line length (line distance) between adjacent cells is longer than a specified length, a repeater is inserted. However, when making layout design using a layout tool, the layout design is performed without insertion of a repeater at the convenience of the tool in some cases. In such a case, it is difficult to satisfy the timing constraints by data line delay correction. Thus, the line length between cells is extracted in advance from the layout information, and when the line length is longer than a specified length, a repeater is inserted and then timing analysis is performed.

Figure 13:
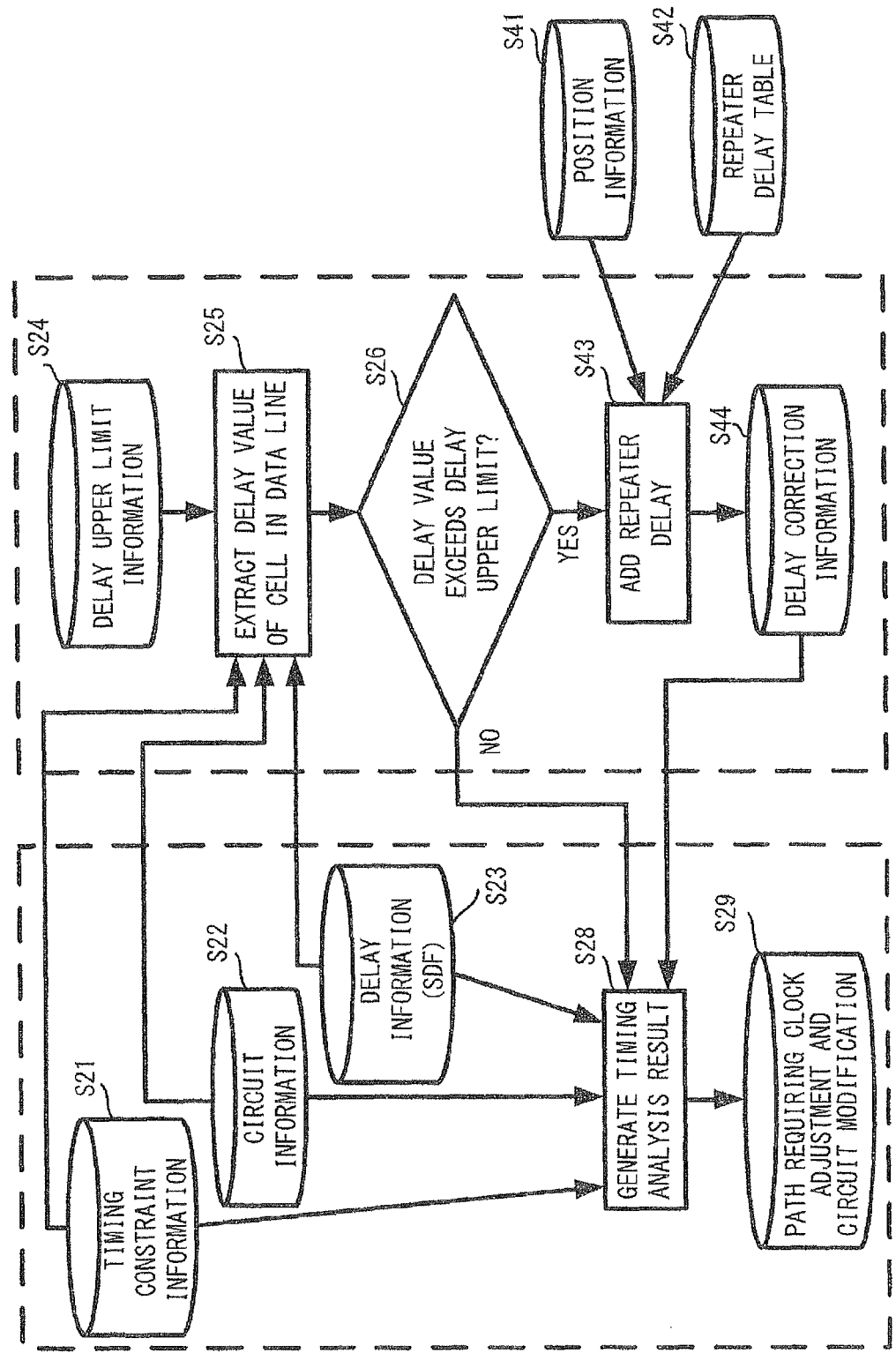
FIG. 13 is a diagram showing an example of a procedure of timing analysis according to a fourth embodiment.

FIG. 13 is a diagram showing an example of a procedure of timing analysis according to the fourth embodiment. In the procedure of timing analysis shown in FIG. 13, processing steps S41 to S43 related to insertion of a repeater are added to the procedure of timing analysis according to the second embodiment shown in FIG. 9.

The processing unit 2 further acquires the position information of a plurality of cells from the layout information of a circuit to be analyzed, analyzes the position information and extracts a line where the line length between arbitrary cells is longer than a specified length, and adds the delay value of a repeater to be inserted into the extracted line to the delay correction information, as the delay value change processing.

Steps other than Steps S41 to S44 are the same as those in the second embodiment and not redundantly described.

The processing unit 2 extracts the positions of cells from the layout information of a circuit to be analyzed, generates the position information and stores it into the storage unit 1 (S41). By acquiring the positions of cells, the line length between cells can be calculated based on the positions of adjacent cells.

A repeater delay table is predefined information and stored in the storage unit 1. The processing unit 2 reads and acquires the repeater delay table from the storage unit 1 (S42).

When the processing unit 2 determines that the delay value of the cell constituting the data line exceeds the delay upper limit in Step S26 (YES in S26), it analyzes the position information and, when the line length between the adjacent cells is longer than a specified value, adds the delay value. The delay value to be added is acquired based on the repeater delay table. FIG. 14 shows an example of the repeater delay table. In the example of FIG. 14, 150 ps is added to the delay upper limit when the line length is longer than 500 μm, and further 150 ps is added each time the line length exceeds 500 μm after that.

The processing unit 2 adds a delay correction value calculated based on the repeater delay table to the delay upper limit (S43), generates delay correction information and stores it into the storage unit 1 (S44).

When a uniform delay value as described in the first and second embodiments is used for a part where a repeater or the like is not inserted, an estimated violation value cannot be corrected in some cases. To avoid this, the distance information between pins is extracted and, when they are at the distance longer than a value to require a repeater, the delay for the repeater is added.

Further, although the case of performing the delay value change processing that inserts a repeater in the technique of timing analysis according to the second embodiment is illustrated in FIG. 13, the processing may be added to the first embodiment. In this case, the processing unit 2 acquires the position information of a plurality of cells from the layout information of a circuit to be analyzed, analyzes the position information and extracts a line where the line length between arbitrary cells is longer than a specified length, and adds the delay value of a repeater to be inserted into the extracted line to the estimation result of a slack value, for example.

As described above, in this embodiment, the delay value change processing acquires the position information of a plurality of cells from the layout information of a circuit to be analyzed, analyzes the position information and extracts a line where the line length between arbitrary cells is longer than a specified length. The analysis processing is performed to reflect the delay value of a repeater to be inserted into the extracted line on the timing analysis result. This enables easy determination as to whether a violation value of the timing constraints can be eliminated by data line delay correction even when the line length is long, thereby improving the accuracy.

Other Embodiments

In the above embodiments, the case where the technique of timing analysis according to one embodiment is implemented by the timing analysis program is described. In the above example, the program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Further, the program may be recorded on a portable recording medium such as a CD (Compact Disk) or a USB (Universal Serial Bus) memory incorporating a flash memory. In this case, the execution program is installed from the portable recording medium through a CD drive, a USB port or the like mounted on a computer.

Although the case where the timing analysis technique according to one embodiment is implemented by the program is described in the above embodiments, the invention is not limited thereto, and it does not exclude the case of implementation by a combination of hardware, firmware and software.

Further, each of the above embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A non-transitory computer readable medium storing a timing analysis program causing a computer to execute, comprising:

storage processing of storing circuit information of a circuit to be analyzed and to be fabricated as a semiconductor integrated circuit, timing constraint information defining timing constraints on the circuit to be analyzed, delay information defining a plurality of delay values associated with a plurality of cells constituting the circuit to be analyzed, and delay upper limit information including at least one delay upper limit for setting an upper limit to the plurality of delay values associated with the plurality of cells into a storage unit, the storage processing being executed on the computer including a processor;

delay value change processing of changing, at least one of the plurality of delay values associated with the plurality of cells to the delay upper limit, to provide a changed delay upper limit, the delay value change processing being executed on the computer;

analysis processing of analyzing timing of the circuit to be analyzed by estimating a slack value using the changed delay upper limit in addition to the circuit information, the timing constraint information, and the delay information, the analysis processing being executed on the computer; and a delay upper limit setting processing of retrieving the circuit information of the circuit to be analyzed, and setting a value calculated by applying a calculated average to a cell with highest driving capability for each function of the plurality of cells as the delay upper limit set for each function of the plurality of cells.

2. The non-transitory computer readable medium according to claim 1, wherein
the delay value change processing receives a timing analysis result generated using the delay information as input and replaces at least one of the plurality of delay values contained in the timing analysis result with the delay upper limit,
the analysis processing generates an estimation result of a slack value using the delay upper limit set by the delay value change processing, and
the delay upper limit being changed without cell resizing of the plurality of cells.

3. The non-transitory computer readable medium according to claim 2, wherein
the delay value change processing extracts a path where the slack value shown in the timing analysis result indicates a timing violation, detects a cell where the delay value is larger than the delay upper limit from the plurality of delay values included in the extracted path, and changes the delay value of the detected cell to the delay upper limit, and
the analysis processing calculates the estimation result using the changed delay upper limit.

4. The non-transitory computer readable medium according to claim 3, wherein the analysis processing inserts the estimation result into the timing analysis result, and makes the slack value calculated by analyzing timing using the delay information and the estimation result show in the timing analysis result.

5. The non-transitory computer readable medium according to claim 2, wherein the delay value change processing acquires position information of the plurality of cells from the circuit information of the circuit to be analyzed, analyzes the position information and extracts a line where a line length between given cells is longer than a specified length, and adds a delay value of a repeater to be inserted into the extracted line to a modification result of the timing analysis result.

6. The non-transitory computer readable medium according to claim 1, wherein
the delay value change processing extracts a cell constituting a data line from the circuit information and, when the delay value associated with the cell exceeds the delay upper limit, generates delay correction information that modifies the delay value to the delay upper limit, and
the analysis processing generates a timing analysis result by analyzing timing using the delay correction information.

7. The non-transitory computer readable medium according to claim 6, wherein, when generating the delay correction information, the delay value change processing extracts output pins of cells different from a clock from the circuit information, and, for a given cell, acquires the delay value associated with an output pin of a previous cell to an output pin of the given cell from the delay information, and, when the acquired delay value is larger than the delay upper limit, changes the acquired delay value to the delay upper limit.

8. The non-transitory computer readable medium according to claim 7, wherein, when generating the delay correction information, the delay value change processing acquires position information of the plurality of cells from the circuit information of the circuit to be analyzed, analyzes the position information and extracts a line where a line length between given cells is longer than a specified length, and adds a delay value of a repeater to be inserted into the extracted line to the delay correction information.

9. The non-transitory computer readable medium according to claim 6, wherein, when generating the delay correction information, the delay value change processing acquires position information of the plurality of cells from the circuit information of the circuit to be analyzed, analyzes the position information and extracts a line where a line length between given cells is longer than a specified length, and adds a delay value of a repeater to be inserted into the extracted line to the delay correction information.

10. The non-transitory computer readable medium according to claim 1, wherein the delay upper limit information includes the delay upper limit set for each function of the plurality of cells, and
wherein the analysis processing of analyzing timing of the circuit to be analyzed by estimating the slack value to determine whether a circuit to be analyzed satisfies timing constraints or not when a data line delay is corrected.

11. The non-transitory computer readable medium according to claim 10, storing the timing analysis program causing a computer to further execute:
delay upper limit setting processing of retrieving the circuit information of the circuit to be analyzed, extracting a line capacitance and an input waveform bluntness of the plurality of cells, calculating an average of the extracted line capacitance and the waveform bluntness in a chip, and setting a value calculated by applying the calculated average to a cell with highest driving capability for each function of the plurality of cells as the delay upper limit set for each function of the plurality of cells.

12. The non-transitory computer readable medium according to claim 1, wherein
the delay value change processing acquires position information of the plurality of cells from the circuit information of the circuit to be analyzed, analyzes the position information and extracts a line where a line length between given cells is longer than a specified length, and
the analysis processing adds a delay value of a repeater to be inserted into the extracted line to a timing analysis result generated using the delay information.

13. The non-transitory computer readable medium according to claim 1, wherein
the delay value of a given cell is the amount of delay from an output pin of a previous cell of the given cell to an output pin of the given cell, and
the delay upper limit is a total value of a net delay between the previous cell and the given cell and the delay value of the given cell.

14. The non-transitory computer readable medium according to claim 1, wherein
the delay value associated with the plurality of cells includes a plurality of cell delay values defined for the plurality of cells and a net delay value defined for a line between the plurality of cells, and
the delay upper limit includes at least one cell delay upper limit set for the plurality of cells and a net delay upper limit set for a line between the plurality of cells.

15. A timing analysis device comprising:
- a non-transitory storage unit that is configured to store circuit information of a circuit to be analyzed and to be fabricated as a semiconductor integrated circuit, timing constraint information defining timing constraints on the circuit to be analyzed, delay information defining a plurality of delay values associated with a plurality of cells constituting the circuit to be analyzed, and delay upper limit information including at least one delay upper limit for setting an upper limit to the plurality of delay values associated with the plurality of cells; and
- a processor that is configured to change, at least one of the plurality of delay values associated with the plurality of cells to the delay upper limit, to provide a changed delay upper limit, and to analyze timing of the circuit to be analyzed by estimating a slack value using the changed delay upper limit,
- wherein the processor is configured to perform a delay upper limit setting processing of retrieving circuit information of the circuit to be analyzed, and setting a value calculated by applying a calculated average to a cell with highest driving capability for each function of the plurality of cells as the delay upper limit set for each function of the plurality of cells.

16. The timing analysis device according to claim 15, wherein the processor receives a timing analysis result generated using the delay information as input, replaces at least one of the plurality of delay values contained in the timing analysis result with the delay upper limit, and generates an estimation result of a slack value using the delay upper limit.

17. The timing analysis device according to claim 15, wherein the processor extracts a cell constituting a data line from the circuit information and, when the delay value associated with the cell exceeds the delay upper limit, generates delay correction information that modifies the delay value to the delay upper limit, and generates a timing analysis result by analyzing timing using the delay correction information, and
- wherein the delay upper limit being changed without cell resizing of the plurality of cells.

18. The timing analysis device according to claim 15, wherein the delay upper limit information includes the delay upper limit defined for each function of the plurality of cells.

19. The timing analysis device according to claim 15, wherein the processor acquires position information of the plurality of cells from the circuit information of the circuit to be analyzed, analyzes the position information and extracts a line where a line length between given cells is longer than a specified length, and adds a delay value of a repeater to be inserted into the extracted line to a timing analysis result generated using the delay information, and
- wherein the processor setting the delay upper limit by retrieving the circuit information of the circuit to be analyzed, extracting a line capacitance and an input waveform bluntness of the plurality of cells, calculating an average of the extracted line capacitance and the waveform bluntness in a chip, and setting a value calculated by applying the calculated average to a cell with highest driving capability for each function of the plurality of cells as the delay upper limit set for each function of the plurality of cells.

20. A timing analysis method comprising:
- storing circuit information, by a computer, of a circuit to be analyzed by the computer and to be fabricated as a semiconductor integrated circuit, timing constraint information defining timing constraints on the circuit to be analyzed, delay information defining a plurality of delay values associated with a plurality of cells constituting the circuit to be analyzed, and delay upper limit information including at least one delay upper limit for setting an upper limit to the plurality of delay values associated with the plurality of cells into a storage unit;
- changing, by the computer, at least one of the plurality of delay values associated with the plurality of cells to the delay upper limit, to provide a changed delay upper limit;
- analyzing timing, by the computer, of the circuit to be analyzed by estimating a slack value using the changed delay upper limit in addition to the circuit information, the timing constraint information, and the delay information; and
- performing a delay upper limit setting processing, by the computer, of retrieving circuit information of the circuit to be analyzed, and setting a value calculated by applying a calculated average to a cell with highest driving capability for each function of the plurality of cells as the delay upper limit set for each function of the plurality of cells.

* * * * *